United States Patent [19]

Smetz

[11] 4,151,708

[45] May 1, 1979

[54] CHAIN-SHORTENING CLAW

[76] Inventor: Reinhold G. E. Smetz, Baldingerstrasse 2, 8860 Nördlingen, Fed. Rep. of Germany

[21] Appl. No.: 881,595

[22] Filed: Feb. 27, 1978

[30] Foreign Application Priority Data

Mar. 18, 1977 [DE] Fed. Rep. of Germany ....... 2712605

[51] Int. Cl.² .............................................. F16G 17/00
[52] U.S. Cl. .................................... 59/93; 24/116 R; 24/230.5 AD; 294/83 R
[58] Field of Search .................. 59/93, 84, 85, 86; 294/82, 78 R, 83 R; 24/116 R, 230.5 R, 230.5 AD

[56] References Cited

U.S. PATENT DOCUMENTS

| | | | |
|---|---|---|---|
| 2,978,766 | 4/1961 | Arnett | 24/116 R |
| 3,333,412 | 8/1967 | Rieger | 59/93 |
| 3,601,978 | 8/1971 | Rieger | 59/93 |

FOREIGN PATENT DOCUMENTS 2433345  1/1976  Fed. Rep. of Germany ............. 59/93

*Primary Examiner*—C. W. Lanham
*Assistant Examiner*—Gene P. Crosby
*Attorney, Agent, or Firm*—Parmelee, Johnson, Bollinger & Bramblett

[57] ABSTRACT

In a double-pronged chain-shortening claw a safety device for preventing inadvertent release of a chain link supported in a pocket formed between two prongs of the claw. The safety device comprising a locking tongue which can be moved from an inoperative into an operative position in which the tongue projects between the arms of the chain link situated in the pocket.

8 Claims, 3 Drawing Figures

CHAIN-SHORTENING CLAW

The invention relates to a chain-shortening claw with two substantially parallel hooks joined together by a back of the claw, the hooks having prongs forming a slot between them and forming a pocket to accommodate and support a suspended chain link occupying a plane substantially perpendicular to the plane of the slot, the suspended chain link being made safe against inadvertent release from the pocket of the claw by a safety device.

In the construction of claws of this kind it is important to ensure that once the suspended chain link has been engaged in the pocket of the claw it cannot be inadvertently released. To ensure this, in a known chain-shortening claw the pocket for accommodating the suspended chain link has at least one inserted pad of an elastically flexible material positioned to co-operate with outer surfaces of the arms of the link. The pad thrusts against the link so as to retain it in the pocket (German Patent Specification No. 1 775 813). But the known arrangement is not entirely satisfactory, in that the pad has to engage rather precisely with the surface of the suspended chain link in order to provide sufficient frictional hold. Furthermore, when the chain-shortening claw is operating in an oily or graphitic environment the frictional effects are modified and this can impair the effectiveness of the safety device.

In another known chain-shortening claw the retention of the suspended chain link in the pocket of the claw is not obtained by using an elastic insert, but rather by using a pivoted safety device somewhat resembling a brake wedge (German Offenlegungsschrift No. 2,433 345). The safety device is thrust by a spring against the curved end of the chain link contained in the slot in the claw, the safety device thrusting against the portion of the curved end facing towards the back of the claw. But here again the suspended chain link is not reliably retained in the pocket of the claw, because no mechanically positive lock is provided.

The invention in the present invention is to provide a chain-shortening claw of the kind first above described but which ensures that the chain link suspended in the pocket of the claw is locked in place by a mechanically positive lock and this with the claw in practically any operating position.

Accordingly there is provided according to the invention a double-pronged chain-shortening claw, with two substantially parallel hooks joined together by a back of the claw, the hooks having prongs forming a slot between them and forming a pocket to accommodate and support a suspended chain link occupying a plane substantially perpendicular to the plane of the slot, the suspended chain link being made safe against inadvertent release from the pocket of the claw by a safety device, the safety device being arranged with a locking tongue which can be moved from an inoperative into an operative position in which the tongue projects between the arms of the chain link situated in the pocket, so that the adjacent link of the chain is securely locked in place in the slot between the prongs.

The chain-shortening claw according to the invention has the advantage that the locking tongue projects far enough into the interior of the pocket in the claw so that it acts like the prong of a buckle in preventing the chain link situated in the slot of the claw from escaping. Even jerky stresses applied to the chain links changing loosely from the mouth of the claw do not cause the link contained in the pocket to slip inadvertently out.

A claw according to this invention is unusually easy to operate, in that the safety device can be actuated by the thumb of the operator, who is holding the chain-shortening claw in the same hand while engaging or disengaging the suspended chain link.

The safety device is normally influenced into its locking position by a spring. Nevertheless, in order to ensure that even if the spring is broken the suspended link still remains locked in place, as long as the claw is in an upright position, the chain-shortening claw can with advantage be so designed and arranged that the safety device tends to adopt or remain in its operative position.

The invention will now be described in greater detail on the basis of the example represented in the drawings, in which.

Figure 1:
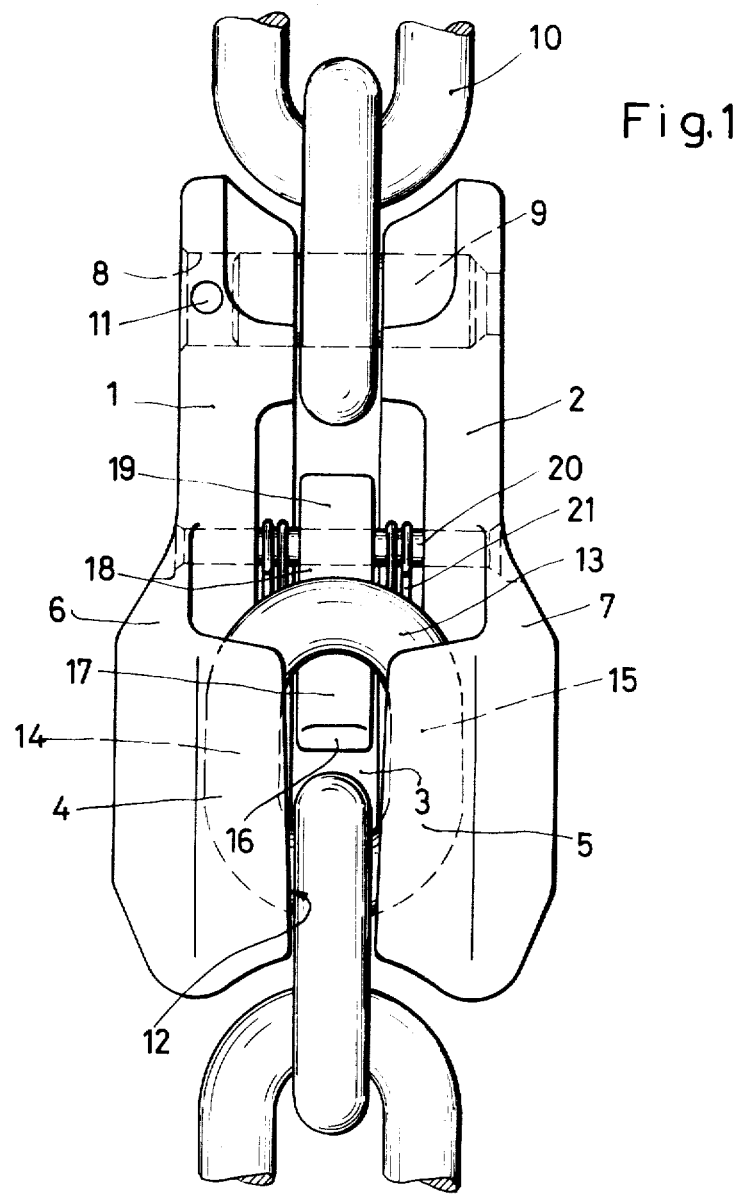
FIG. 1 is a front view of the chain-shortening claw according to the invention.

The figures show two hooks 1 and 2 joined together by a back 3. The two hooks have prongs 4, 5 whose ends are joined to the body of the claw by webs 6, 7. The chain-shortening claw has a bore 8 containing a pin 9 which penetrates through a link of the upper chain from which the claw is suspended, the pin 9 being secured in place by a spring sleeve 11.

The hooks 1, 2 and the back of the claw together form a pocket which accommodates and supports a suspended chain link 13 of the lower chain which it is desired to shorten, the link 13 occupying a plane essentially perpendicular to the plane of the slot 12 extending between the two prongs 4, 5 of the claw.

A tongue 16 of a safety device 17 penetrates from behind between the arms 14, 15 of the suspended chain link 13, the safety device 17 having two arms 18, 19 forming an angle between them. The safety device 17 is pivoted on a pin 20 and is influenced by a spring 21 to rotate anticlockwise, to bring the locking tongue 16 into the position shown in FIG. 2, in which position the safety device 17 is prevented from rotating any further by a shoulder 22 of the back 3 of the claw.

Figure 2:
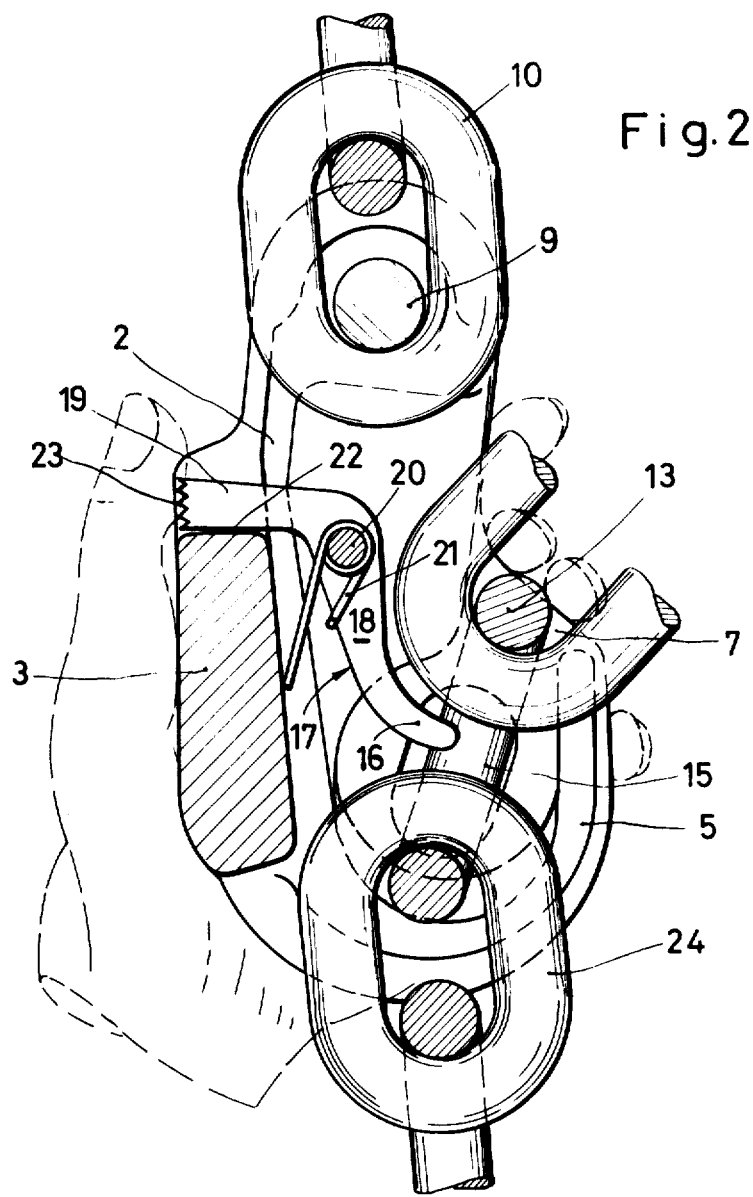
FIG. 2 is a longitudinal section of the claw of FIG. 1.
Figure 3:
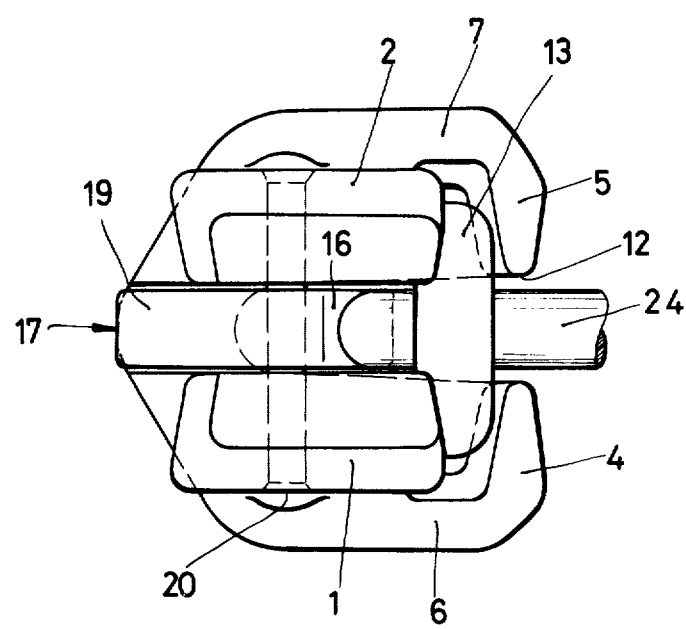
FIG. 3 is a view from above.

As shown best in FIG. 2, the arm 19 of the safety device 17 has a riffled end-surface 23 to facilitate actuation by the operator's thumb, and it will be seen that after grasping the chain-shortening claw with one hand, the operator can easily release the safety device by using the thumb of the same hand, simply rotating the safety device clockwise about its pivot pin 20. The riffled surface does not project beyond the outer surface of the back of the claw and consequently the claw can be dragged over the surface of the ground without inadvertent release of the chain link 13 from the pocket of the claw.

Inadvertent escape of the suspended chain link 13 is prevented in that the locking tongue 16, penetrating between the arms of the link 13, projects beyond the peak of the curved upper end of the next lower chain link 24. When this lifts its curved upper end encounters the locking tongue 16, which prevents further upwards movement of the link 24. The chain-shortening claw thus has a mechanically positive lock, an arrangement which is far safer than any frictional lock.

It should be observed that the operator needs to actuate the safety device only for releasing the suspended chain link, not for engaging it in the pocket. This is because the tongue of the safety device has a shape adapted to prevent only disengagement of the suspended link, and to do this reliably.

The arm 19 of the safety device exerts a torque on the tongue when the shortening claw is in vertical disposition and hence the tongue tends to adopt or remain in its operative position, even if the spring 21 is inoperative or absent, in the vertical disposition of the claw.

I claim:

1. A double-pronged chain-shortening claw, with two substantially parallel hooks joined together by a back of the claw, the hooks having prongs forming a slot between them and forming a pocket to accommodate and support a suspended chain link occupying a plane substantially perpendicular to the plane of the slot, the suspended chain link being made safe against inadvertent release from the pocket of the claw by a safety device, the safety device being arranged with a locking tongue which can be moved from an inoperative into an operative position in which the tongue projects between the arms of the suspended chain link and forms a stop for the bow of the chain link adjacent to the suspended link so that the adjacent link is securely locked in place in the slot between the prongs.

2. A double-pronged chain-shortening claw, with two substantially parallel hooks joined together by a back of the claw, the hooks having prongs forming a slot between them and forming a pocket to accommodate and support a suspended chain link occupying a plane substantially perpendicular to the plane of the slot, the suspended chain link being made safe against inadvertent release from the pocket of the claw by a safety device, wherein the safety device includes a lever with two arms forming an angle between them, one arm having a locking tongue which can be moved from an inoperative into an operative position in which the tongue projects between the arms of the suspended chain link and forms a stop for the bow of the chain link adjacent to the suspended link so that the adjacent link is securely locked in place in the slot between the prongs whereas the other arm forms an actuator which extends above the back of the claw between the two hooks.

3. A double-pronged chain-shortening claw, with two substantially parallel hooks joined together by a back of the claw, the hooks having prongs forming a slot between them and forming a pocket to accommodate and support a suspended chain link occupying a plane substantially perpendicular to the plane of the slot, the suspended chain link being made safe against inadvertent release from the pocket of the claw by a safety device, wherein the safety device includes a lever with two arms forming an angle between them, one arm having a locking tongue which can be moved from an inoperative into an operative position in which the tongue projects between the arms of the suspended chain link and forms a stop for the bow of the chain link adjacent to the suspended link so that the adjacent link is securely locked in place in the slot between the prongs, whereas the other arm forms an actuator which extends above the back of the claw between the two hooks and has a riffled surface adjacent the back of the claw in the locking position of the tongue.

4. A double-pronged chain-shortening claw, with two substantially parallel hooks joined together by a back of the claw, the hooks having prongs forming a slot between them and forming a pocket to accommodate and support a suspended chain link occupying a plane substantially perpendicular to the plane of the slot, the suspended chain link being made safe against inadvertent release from the pocket of the claw by a safety device, wherein the safety device includes a lever pivoted on a pin which, when the claw is vertically disposed, is situated above the pocket for the suspended chain link, said lever comprising two arms forming an angle between them, one arm having a locking tongue which can be moved from an inoperative into an operative position in which the tongue projects between the arms of the suspended chain link and forms a stop for the bow of the chain link adjacent to the suspended link so that the adjacent link is securely locked in place in the slot between the prongs, whereas the other arm forms an actuator which extends above the back of the claw between the two hooks.

5. A double-pronged chain-shortening claw, with two substantially parallel hooks joined together by a back of the claw, the hooks having prongs forming a slot between them and forming a pocket to accommodate and support a suspended chain link occupying a plane substantially perpendicular to the plane of the slot, the suspended chain link being made safe against inadvertent release from the pocket of the claw by a safety device, wherein the safety device includes a lever pivoted on a pin which, when the claw is vertically disposed, is situated above the pocket for the suspended chain link, said lever comprising two arms forming an angle between them, one arm having a locking tongue which can be moved from an inoperative into an operative position in which the tongue projects between the arms of the suspended chain link and forms a stop for the bow of the chain link adjacent to the suspended link so that the adjacent link is securely locked in place in the slot between the prongs, whereas the other arm forms an actuator which extends above the back of the claw between the two hooks and applies a torque to move the first arm into its locking position when the claw is in its upright position.

6. A double-pronged chain-shortening claw, with two substantially parallel hooks joined together by a back of the claw, the hooks having prongs forming a slot between them and forming a pocket to accommodate and support a suspended chain link occupying a plane substantially perpendicular to the plane of the slot, the suspended chain link being made safe against inadvertent release from the pocket of the claw by a safety device, the safety device being arranged with a locking tongue which can be moved from an inoperative into an operative position in which the tongue projects between the arms of the suspended chain link and forms a stop for the bow of the chain link adjacent to the suspended link so that the adjacent link is securely locked in place in the slot between the prongs, the movement of the tongue into the gap between the arms of the suspended links being limited by a shoulder formed by a portion of the back, said portion cooperating with said tongue.

7. A double-pronged chain-shortening claw, with two substantially parallel hooks joined together by a back of the claw, the hooks having prongs forming a slot between them and forming a pocket to accommodate and support a suspended chain link occupying a plane substantially perpendicular to the plane of the slot, the suspended chain link being made safe against inadvertent release from the pocket of the claw by a safety device, wherein the safety device includes a lever with two arms forming an angle between them, one arm having a locking tongue which can be moved from an inoperative into an operative position in which the tongue projects between the arms of the suspended chain link and forms a stop for the bow of the chain link adjacent to the suspended link so that the adjacent link is securely locked in place in the slot between the prongs, whereas the other arm forms an actuator which extends above the back of the claw between the two hooks, the upper edge of which back forms a shoulder for limiting rotation of the actuator toward said upper edge.

8. In a double-pronged chain-shortening claw, with two substantially parallel hooks joined together by a back of the claw, the hooks having prongs forming a slot between them and forming a pocket to accommodate and support a suspended chain link occupying a plane substantially perpendicular to the plane of the slot, the improvement comprising a safety device for preventing inadvertent release of the suspended chain link from the pocket of the claw, said safety device including a lever with two arms forming an angle between them, one arm having a locking tongue which can be moved from an inoperative into an operative position in which the tongue projects between the arms of the suspended chain link and forms a stop for the bow of the chain link adjacent to the suspended link so that the adjacent link is securely locked in place in the slot between the prongs, whereas the other arm forms an actuator which extends above the back of the claw between the two hooks, the upper edge of which back forms a shoulder for limiting rotation of the actuator toward said upper edge.

* * * * *

UNITED STATES PATENT OFFICE
CERTIFICATE OF CORRECTION

Patent No. 4,151,708             Dated May 1, 1979

Inventor(s) Reinhold G. E. Smetz

It is certified that error appears in the above-identified patent and that said Letters Patent are hereby corrected as shown below:

Column 1, Line 42:  "invention" (first occurrence) should be -- intention --.

Column 1, Line 68:  "changing" should be -- hanging --.

Signed and Sealed this

Tenth Day of July 1979

[SEAL]

Attest:

LUTRELLE F. PARKER
Attesting Officer     Acting Commissioner of Patents and Trademarks

UNITED STATES PATENT OFFICE
CERTIFICATE OF CORRECTION

Patent No. 4,151,708      Dated May 1, 1979

Inventor(s) Reinhold G. E. Smetz

It is certified that error appears in the above-identified patent and that said Letters Patent are hereby corrected as shown below:

The inventor's correct first name is

-- Reinhard --.

Signed and Sealed this

Sixteenth Day of October 1979

[SEAL]

Attest:

RUTH C. MASON
*Attesting Officer*

LUTRELLE F. PARKER
*Acting Commissioner of Patents and Trademarks*